(12) United States Patent
Smith et al.

(10) Patent No.: US 8,924,048 B2
(45) Date of Patent: *Dec. 30, 2014

(54) GRADUATED VEHICLE BRAKING

(75) Inventors: Eugene A. Smith, Melbourne, FL (US); Steven Andrew Kellner, Melbourne, FL (US); Glen Paul Peltonen, Melbourne, FL (US); Brian Lee Staton, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 329 days.
This patent is subject to a terminal disclaimer.

(21) Appl. No.: 13/442,911

(22) Filed: Apr. 10, 2012

(65) Prior Publication Data
US 2012/0197476 A1    Aug. 2, 2012

Related U.S. Application Data

(63) Continuation-in-part of application No. 11/067,440, filed on Feb. 25, 2005, now Pat. No. 8,162,409.

(60) Provisional application No. 60/588,094, filed on Jul. 15, 2004.

(51) Int. Cl.
| *B61H 11/02* | (2006.01) |
|---|---|
| *B60T 7/16* | (2006.01) |
| *B60T 7/12* | (2006.01) |
| *B60T 8/17* | (2006.01) |
| *B60T 8/88* | (2006.01) |
| *B60T 13/66* | (2006.01) |
| *B60T 17/22* | (2006.01) |
| *B61L 3/12* | (2006.01) |

(52) U.S. Cl.
CPC . *B60T 7/128* (2013.01); *B60T 7/16* (2013.01); *B60T 8/1705* (2013.01); *B60T 8/885* (2013.01); *B60T 13/665* (2013.01); *B60T 17/228* (2013.01); *B61L 3/127* (2013.01); *B60T 2230/04* (2013.01); *B60T 2270/402* (2013.01)
USPC .......... 701/19; 701/20; 701/70; 246/3; 246/4; 246/27; 246/182 R; 246/182 B (58) Field of Classification Search
CPC .......... B61L 27/04; B61L 3/006; B61C 17/12
USPC .......... 701/19, 20, 70–98; 246/3, 4, 6, 14, 15, 246/27, 182 R, 182 B
See application file for complete search history.

(56) References Cited

U.S. PATENT DOCUMENTS

| 4,066,230 A | * | 1/1978 | Nohmi et al. | ............. 246/182 B |
| 4,190,220 A | * | 2/1980 | Hahn et al. | ................ 246/182 B |

(Continued)

FOREIGN PATENT DOCUMENTS

DE    4409632 A1    9/1994

OTHER PUBLICATIONS

Search Report and Written Opinion for corresponding International Patent Application No. PCT/US2005/034451, dated Mar. 9, 2006.

*Primary Examiner* — Thomas G Black
*Assistant Examiner* — Sara Nelson
(74) *Attorney, Agent, or Firm* — GE Global Patent Operation; John A. Kramer (57) ABSTRACT

A method for automatically controlling braking of a powered system or consist includes automatically applying a first degree of braking to a consist during a first time period when a powered unit of the consist is being locally or remotely controlled via an onboard control system in an absence of control inputs from an onboard operator. The first degree of braking is based on a first deceleration force selected so that the consist is slowed in a manner effective to limit a peak deceleration rate experienced by the consist sufficient for reducing unintended movement of at least one of one or more riders or cargo onboard the consist. The method also includes automatically applying a second degree of braking to the consist during a second time period following the first time period.

22 Claims, 2 Drawing Sheets

(56) References Cited

U.S. PATENT DOCUMENTS

| | | | |
|---|---|---|---|
| 4,409,632 A * | 10/1983 | Kanai et al. | 360/123.18 |
| 4,495,578 A * | 1/1985 | Sibley et al. | 701/20 |
| 4,835,693 A | 5/1989 | Smith | |
| 4,836,693 A * | 6/1989 | Stroze | 384/121 |
| 5,474,267 A * | 12/1995 | Kubota et al. | 246/182 B |
| 5,505,531 A * | 4/1996 | Griffith et al. | 303/126 |
| 7,079,926 B2 * | 7/2006 | Kane et al. | 701/19 |
| 2003/0209638 A1 * | 11/2003 | Peltz | 246/167 R |

\* cited by examiner

GRADUATED VEHICLE BRAKING

CROSS REFERENCE TO RELATED APPLICATIONS

This application is a continuation-in-part of U.S. patent application Ser. No. 11/067,440, filed Feb. 25, 2005 now U.S. Pat. No. 8,162,409, which claims priority to U.S. Provisional Application Ser. No. 60/588,094, filed on Jul. 15, 2004, both of which are incorporated herein by reference.

TECHNICAL FIELD

The inventive subject matter described herein relates generally to the field of powered vehicle control, and more particularly to automatically controlling application of brakes responsive to a sensed condition.

BACKGROUND

It is known to remotely control locomotives in a rail yard using remote radio transmitting devices controlled by rail yard personnel. Such remote control systems may include an operator control unit (OCU) or control tower unit in remote communication with a locomotive control unit (LCU) disposed onboard the locomotive. The LCU interfaces with known locomotive systems, such as locomotive traction control systems, and pneumatic train braking systems, to direct the locomotive to move and stop according to transmitted commands. For example, the LCU may provide commands to an automatic braking system for controlling braking of the locomotive (and any other locomotive or rail cars pneumatically attached to the locomotive) by modulating an air pressure in a brake pipe. The LCU may also provide commands to an independent braking system for controlling braking of the locomotive, independently of the automatic system, by modulating an air pressure in a locomotive pipe. In addition, the LCU may command a "bail" capability to control automatic braking of the locomotive independently of automatic braking applied to the rest of the train.

Under certain conditions, such as when the LCU detects a system fault, the LCU may automatically control operation of the locomotive until the fault is corrected. For example, the LCU may automatically stop movement of the locomotive by activating train braking systems when a certain fault is detected.

BRIEF SUMMARY

In one embodiment, a method (e.g., for automatically controlling braking of a powered system or consist) includes automatically applying a first degree of braking to a consist during a first time period when a powered unit of the consist is being locally or remotely controlled via an onboard control system in an absence of control inputs from an onboard operator. The first degree of braking is based on a first deceleration force selected so that the consist is slowed in a manner effective to limit a peak deceleration rate experienced by the consist sufficient for reducing unintended movement of at least one of one or more riders or cargo onboard the consist. The method also includes automatically applying a second degree of braking to the consist during a second time period following the first time period.

In another embodiment, another method (e.g., for automatically controlling application of a brake in a consist) is provided. The method includes automatically applying a first degree of braking to a consist during a first time period when a powered unit of the consist is being controlled via an onboard control system in an absence of control inputs from an onboard operator and automatically applying a second degree of braking to the consist during a second time period following the first time period. The first degree of braking is based on a first deceleration force selected so that the consist is slowed in a manner effective to limit a peak deceleration rate experienced by the consist such that unintended movement of cargo on board the consist is reduced.

In another embodiment, a control system includes a processor and a memory. The processor is configured to be disposed onboard a powered unit of a consist and to control braking efforts provided by a brake of the consist. The memory is configured to be communicatively coupled with the processor and includes a braking schedule that designates plural degrees of braking. The processor also is configured to automatically direct the brake of the consist to apply a first degree of braking of the plural degrees of braking in the memory during a first time period when the powered unit is being controlled by the processor in an absence of control inputs from an onboard operator. The first degree of braking is based on a first deceleration force selected so that the consist is slowed in a manner effective to limit a peak deceleration rate experienced by the consist sufficient for reducing unintended movement of at least one of one or more riders or cargo onboard the consist. The processor also is configured to automatically direct the brake of the consist to apply a second degree of braking to the consist during a second time period following the first time period.

DETAILED DESCRIPTION

The application of brakes of a powered unit (e.g., a vehicle capable of self-propulsion, such as a locomotive) by automatic operation of a vehicle control system may result in braking forces that have potentially adverse effects in some applications. In one embodiment of the inventive subject matter described herein, it is desired to automatically control brake application in powered units in a graduated manner to avoid excessive forces applied to a rider of the vehicle (e.g., a passenger or rider) and/or non-passenger cargo of the vehicle as a result of applying the brakes. For example, if a locomotive (remotely controlled or controlled by an operator or controller disposed onboard the locomotive) is commanded to apply train brakes too quickly in response to a fault condition, a passenger or cargo on or being transported by the locomotive may be abruptly thrown forward and may be injured as a result of overly aggressive braking that results in a decelerations, or g-forces, sufficient to cause unintended movement of the passenger or cargo on or being transported by the locomotive. Additionally, when the locomotive decelerates quickly, the freight cars may not decelerate as quickly and may subsequently run in to the locomotive, causing unexpected acceleration and significant in-train forces, which may result in the rider being thrown backwards. While some examples described herein focus on trains, locomotives, and/ or remotely controlled locomotives, not all embodiments of the inventive subject matter are limited to trains, locomotives, and/or remotely controlled vehicles. For example, one or more embodiments may be used in connection with other powered units, such as off highway vehicles (OHV) other than trains, automobiles, marine vessels, and the like, and/or powered units that are not remotely controlled (e.g., powered units that are manually controlled by an operator disposed onboard the unit and/or automatically controlled by an onboard controller). Accordingly, at least one embodiment described herein provides for use of a graduated brake application schedule that may be used, for example, to progressively command application of brakes in a powered unit (e.g., a vehicle) when a fault condition requiring the powered unit to be stopped or slowed is sensed.

Figure 1:
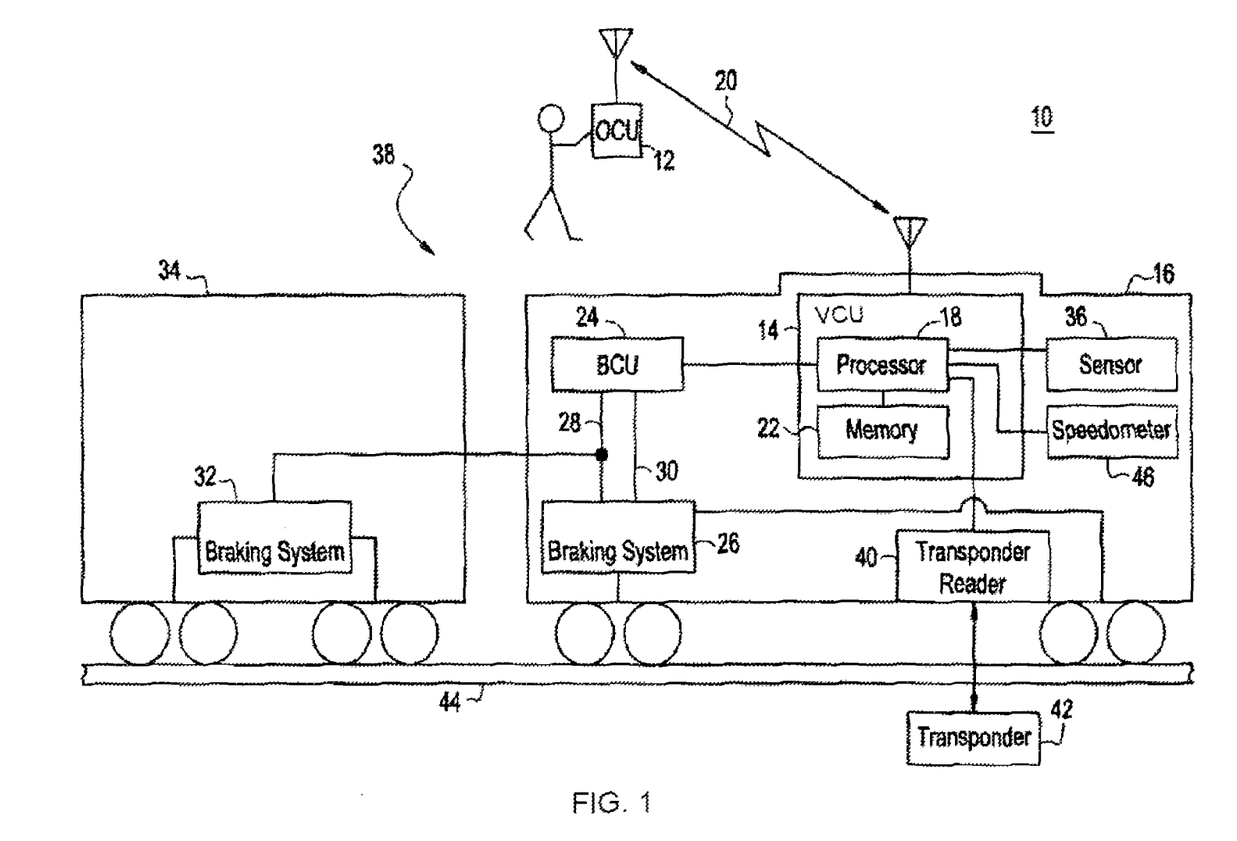
FIG. 1 illustrates a block diagram of one embodiment of a control system of a powered unit for automatically controlling application of brakes of the powered unit.

FIG. 1 illustrates a block diagram of one embodiment of a control system 10 of a powered unit 16 for automatically controlling application of brakes of the powered unit 16. While the powered unit 16 is illustrated as a rail vehicle, such as a locomotive, alternatively, the powered unit 16 may represent another vehicle that is capable of self-propulsion. In the illustrated embodiment, the system 10 includes an onboard control system that is located onboard the powered unit 16. The onboard control system may be used to control operations of the powered unit 16. In the illustrated embodiment, the onboard control system includes a vehicle control unit (VCU) 14 that is disposed onboard the powered unit 16 and is in wireless communication with an operator control unit (OCU) 12 located off board the powered unit 16. The control of the onboard control system using the off board OCU 12 may be referred to as remote control of the powered unit 16. Additionally or alternatively, the powered unit 16 may be locally controlled, such as by being controlled by a source of commands that is disposed onboard the powered unit 16. For example, the VCU 14 may be manually controlled by an operator disposed onboard the powered unit 16 that provides control inputs to the VCU 14 to control operations of the powered unit 16. As another example, the VCU 14 can be automatically controlled, such as by controlling operations of the powered unit 16 in the absence of control inputs from the operator. For example, the processor 18 may access a memory 22 or other data source to obtain a trip plan that includes one or more designated operational settings of the powered unit 16 (e.g., traction settings and/or brake settings) that are expressed as a function of time and/or distance along a route. The processor 18 may then control the operations of the powered unit 16 to correspond to or match the designated operational settings of the trip plan.

The VCU 14 may include a processor 18 for receiving commands over a wireless link 20 with the OCU and for operating vehicle systems in response to OCU generated commands. The processor 18 may access a memory 22 based on information transmitted from the OCU 12 and/or based on sensed conditions of the powered unit 16. The processor 18 may receive feedback from one or more sensors 36 that monitor conditions of the powered unit 16. The information or feedback that is provided by the sensors 36 may be referred to as operational conditions of the powered unit 16 and/or a consist 38 that includes the powered unit 16. For example, the processor 18 may receive acceleration/deceleration information from an accelerometer as operational conditions, acceleration/deceleration information may be derived from a vehicle speedometer 46 as operational conditions, or other information from one or more other sensors. The processor 18 may control operations of the powered unit 16 in response to operator commands that are received using the VCU 14 or to operational conditions received from one or more sensors, such as data received by a transponder reader 40 that senses transponders 42 (e.g., radio frequency identification (RFID) tags that are encoded with vehicle operation parameters and positioned along a route 44 being traversed by the powered unit 16, such as a rail, track, road, waterway, and the like).

The VCU 14 may be in communication with a Brake Control Unit (BCU) 24 that controls a braking system 26 of the powered unit 16. In one embodiment, the braking system 26 is a pneumatic braking system that is controlled by the BCU 24 via a brake pipe 28 (e.g., automatic brakes) and/or a vehicle pipe 30 (e.g., independent brakes). The BCU 24 may also control a braking system 32 of a non-powered unit 34, such as a vehicle that is not capable of self-propulsion (e.g., a rail car that is connected with the powered unit 16). The braking system 32 may be a pneumatic braking system in one embodiment. The BCU 24 may control a braking system (e.g., pneumatic or other braking system) of another powered unit (not shown), that is connected (e.g., pneumatically connected or otherwise connected) to the powered unit 16 via the brake pipe 28 to form the consist 38. The term "consist" can refer to two or more powered and/or non-powered vehicles that are connected with each other to travel along a route. Alternatively, the term "consist" may be refer to a single powered unit. For example, the consist 38 may include or refer to a single powered unit 16, two or more powered units 16 connected with each other, one or more powered units 16 connected with one or more non-powered units 34, and the like. One example of a consist is a train, although vehicles other than rail vehicles may be connected in a consist 38. As used herein, the terms "braking system" and "brakes" are meant to include either or both of the automatic brakes and the independent brakes or other braking system of a vehicle, such as a locomotive, a rail car, a train, or other vehicle.

Certain conditions of the powered unit 16 may cause the VCU 14 to automatically control operation of the powered unit 16 until the condition is corrected. For example, if a predetermined fault condition is sensed by the VCU 14, such as the powered unit 16 operating outside prescribed operating parameters, or failures of powered unit 16 or components of the VCU 14, the VCU 14 may command the powered unit 16 to enter a "Park State" until the fault can be corrected. To enter the Park State, the VCU 14 may command the BCU 24 to control the brakes, such as the braking system 26, and/or other braking systems 32 (e.g., rail car pneumatic braking systems of the non-powered unit) connected to the powered unit 16, to stop the consist 38. In the past, if a Park State was indicated, the VCU 14 commanded the BCU 24 to immediately apply full independent braking (via the pipe 30) and full automatic braking (via the pipe 28) to stop the consist 38 as quickly as possible. Typically, full brake application occurred within 13 seconds after the BCU 24 commanded full braking. However, an unexpected deceleration experienced by a passenger and/or cargo onboard the consist 38 under such braking conditions may cause the passenger and/or cargo to be thrown forward, resulting in potential injury or damage. Additionally, an unexpected acceleration caused by a first powered unit 16 and/or non-powered unit 34 running into a braked or slowed second powered unit 16 and/or non-powered unit 34 that is connected or interconnected with the first unit 16 and/or 34 may cause a passenger or cargo to be thrown backward. In one embodiment, a method for controlling braking of a consist that includes one or more powered units and/or non-powered units to moderate a vehicle deceleration rate that may cause injury or damage to a passenger and/or cargo includes detecting an operating condition of the consist that involves braking, and then automatically controlling a braking system of the consist in response to the operating condition by progressively applying an increasing percentage of a fully applied or designated braking condition until achieving the fully applied or designated braking condition. Accordingly, the consist may be slowed in a manner that is effective to limit a peak deceleration rate experienced by the consist and/or one or more powered or non-powered units of the consist. Controlling the braking system of the consist may include progressively increasing brake application according to a graduated braking schedule having a plurality of braking level steps from an initial braking condition to the fully applied or other designated braking condition. One or more, or all, of the steps in the braking schedule may correspond to a respective predetermined time from an initial braking condition. The braking schedule may be stored in the memory 22 and accessed by the processor 18 of the VCU 14 to provide graduated braking of the consist 38 when a fault requiring braking is detected, such as by the sensor 36. An example of one graduated braking schedule is shown in Table 1 below:

TABLE 1

Graduated Braking Schedule

| Braking Parameter (N) | Time (s) | Commanded Independent Brake Level (%) | Example Commanded Independent Brake for J1 Valve (psi) | Example Commanded Independent Brake for J1.6 Valve (psi) | Commanded Automatic Brake Level (psi reduction) | Bail |
| --- | --- | --- | --- | --- | --- | --- |
| 0 | 0 | 0 | 0 | 0 | 0 | N/A |
| 1 | 1 | 3 | 6 | 6 | 7 | Yes |
| 2 | 2 | 6 | 6 | 6 | 7 | Yes |
| 3 | 3 | 9 | 6 | 6.5 | 7 | Yes |
| 4 | 4 | 12 | 6 | 8.5 | 7 | Yes |
| 5 | 5 | 15 | 7 | 11 | 7 | Yes |
| 6 | 6 | 18 | 8 | 13 | 7 | Yes |
| 7 | 7 | 21 | 9.5 | 15 | 7 | Yes |
| 8 | 8 | 24 | 11 | 17.5 | 7 | Yes |
| 9 | 9 | 27 | 12 | 19.5 | 7 | Yes |
| 10 | 10 | 30 | 13.5 | 21.5 | 7 | Yes |
| 11 | 11 | 33 | 15 | 24 | 20 | Yes |
| 12 | 12 | 36 | 16 | 26 | 20 | Yes |
| 13 | 13 | 39 | 17.5 | 28 | 20 | Yes |
| 14 | 14 | 42 | 19 | 30 | 20 | Yes |
| 15 | 15 | 45 | 20.5 | 32.5 | 20 | Yes |
| 16 | 16 | 48 | 21.5 | 34.5 | 20 | Yes |
| 17 | 17 | 51 | 23 | 36.5 | 20 | Yes |
| 18 | 18 | 54 | 24.5 | 39 | 20 | Yes |
| 19 | 19 | 57 | 25.5 | 41 | 20 | Yes |
| 20 | 20 | 60 | 27 | 43 | 20 | Yes |
| 21 | 21 | 63 | 28.5 | 45.5 | 20 | Yes |
| 22 | 22 | 66 | 29.5 | 47.5 | 20 | Yes |
| 23 | 23 | 100 | 45 | 72 | 26 | No |

The example braking schedule depicted in Table 1 applies a 3% commanded increase per second in an independent (e.g., powered unit only) braking level in a series of steps from an initial non-braking condition until reaching a fully applied commanded braking level of 100%. In another embodiment, the braking schedule may increase the braking level to a level other than 100%. Alternatively, the braking schedule may use a different increase for each step or may use different increases for different steps. In another embodiment, the increases may change for different steps. For example, some increases may be associated with larger or smaller increases relative to other steps. Alternatively, the increases for subsequent steps may gradually increase. For example, in a first step, the braking command may increase by 2%. In a subsequent (but not necessarily immediately following the first step) second step, the increase may be 3%. In a subsequent third step, the increase may be 4%, and so on. However, other increases and changes in the increases may be used. Compared to more aggressively applied braking in other control systems for braking a consist in response to a fault condition, the graduated braking schedule of Table 1 provides a more limited deceleration that is sufficiently moderated to reduce a chance of injury to a passenger or damage to cargo. Additionally, such a graduated braking schedule may mitigate the effects of run-in between units 16, 34 in the consist 38 by gradually slowing the units 16, 34. The schedule shown in Table 1 (or another schedule) may be implemented by storing the schedule as a look-up table or other memory structure in the memory 22.

The "Braking Parameter" column in Table 1 is described below in connection with the method 200 shown in FIG. 2. The "Time" column in Table 1 indicates the number of seconds elapsed from declaration of a fault condition, such as a Park State declaration indicated by the processor 18 in response to a sensed condition of the powered, unit 16 or consist 38. The "Commanded Independent Brake Level" column lists the independent brake level percentages for each second of graduated braking to control the independent braking. While the steps of braking increases are associated with different time periods of one second, alternatively, the steps may be associated with longer or shorter time periods. As another example, different steps of the same schedule may be associated with time periods of different duration. In one aspect of the inventive subject matter described herein, once the independent brake level has been commanded to a designated level or within a designated range (e.g., between 50% and 80% of full application), the next time period applies the brakes fully, such as to a 100% application of the independent brakes, or applies the brakes to a designated level that is less than 100% application. In one embodiment, once the independent brake level has been commanded to between 60% and 70% of full application, the next time increment applies the brakes fully, or 100% application of the independent brakes. For example, when 66% of full application of the brakes has been applied, most of the slack action should be out of the consist 38, so that no more run-in jolting would be experienced, by the operator on the consist 38, so there would be no need to continue with a graduated braking schedule.

The "Example Commanded Independent Brake for J1 Valve (psi)" lists a powered unit brake cylinder pressure in pounds per square inch (psi) values commanded (for example, by the BCU 24 in response to the processor 18) corresponding to the percentage of brake application for each second of graduated braking for the braking system 26 equipped with a J1 type valve. Such a valve may be used on locomotives manufactured by General Electric Company. The "Example Commanded Independent Brake for J1.6 Valve (psi)" column lists the brake cylinder pressure psi values commanded (for example, by the BCU 24 in response to the processor 18) corresponding to the percentage of brake application for each second of graduated braking for the braking system 26 equipped with a J1.6 type valve. Such a valve as is commonly used on locomotives manufactured by General Electric Company. The "Commanded Automatic Brake Level (psi reduction)" column lists the psi values commanded for automatic braking, for example, by the BCU 24 in response to the processor 18. The Commanded Automatic Brake Levels correspond to the percentage of brake application for each second of graduated braking. The "Bail" column indicates whether an automatic braking of the powered unit 16 should be commanded to be bailed, or released, corresponding to each second of graduated braking. In one aspect of the inventive subject matter described herein, the automatic brakes are bailed for the duration of graduated braking until a full application brake state is reached (e.g. 100% application) or another designated brake state is reached, for example, at 23 seconds, according to the example schedule of Table 1. Bailing of the brakes in this manner reduces the amount of deceleration of the powered unit 16 and increases the amount of deceleration of non-powered units 34 that are connected to the brake pipe and being pulled or pushed by the powered unit 16, thereby reducing the amount of run in of the non-powered units 34.

In another aspect of the inventive subject matter described herein, the schedule shown in Table 1 may be modified to command certain levels of braking according to a desired deceleration of the consist 38 so that a passenger or cargo does not experience excessive deceleration forces that may cause injury or damage. For example, each step may represent a certain deceleration force, or g-force, level to be maintained at that step. Accordingly, at each step, the processor 18 may control braking of the powered unit 16 to achieve a respective programmed deceleration level stored in the braking schedule. A level of brake application may be different for different circumstances to achieve the same deceleration. For example, variable conditions such as a length of the consist 38, a weight of the consist 38, weather conditions, route inclination, a degree of run-in, and the like, may require different levels of brake application to achieve the same deceleration. Feedback from the accelerometer or speedometer 46 (acceleration/deceleration may be calculated from speed of the powered unit 16 or, consist 34 over time) may be used to achieve the desired level of deceleration corresponding to the schedule. In one example embodiment, a progressively increasing deceleration force may be scheduled, such as 0.1 G at one second, 0.3 G at two seconds, 0.5 G at 3 seconds, and so forth, until reaching a desired or designated peak deceleration force, which may be maintained until the powered unit 16 or consist 34 is stopped. Such a schedule of gradually increasing deceleration forces may allow a passenger to perceive that the consist 38 is being automatically braked and allow the passenger to prepare, such as by holding onto fixed object in the consist 38, for progressively higher deceleration forces expected to be applied by increasingly aggressive braking. In another embodiment, a first degree of braking of the consist 38 may be applied during a first period of time and a second degree of braking of the consist 38 may be applied during a second time period following the first time period. For example, a progressive braking schedule based on an increasing deceleration force may be applied for the first portion of a braking period and then, once a certain peak deceleration force has been achieved, the brakes may be fully applied for the second portion of the braking period until the consist 38 is stopped.

A graduated braking schedule, such as the schedule depicted in Table 1 or another schedule, may be overridden or ignored under certain circumstances. For example, if automatic and/or independent brakes on a powered unit 16 are already being applied at a time when a fault requiring braking occurs, the powered unit 16 may be instructed to apply the brakes in a more restrictive manner between a current brake application level and a brake application level that would be applied according to the graduated schedule. If the brakes of the consist 38 are currently being applied more quickly than the graduated schedule would apply the brakes when the fault occurs, then the powered unit 16 may be commanded to override the graduated schedule. In another example, if a certain amount of braking is already being applied when a fault occurs, such as if the a brake cylinder pressure of the brakes is greater than 25 psi, then graduated braking may be overridden. If the consist 38 is already stopped when a fault requiring stopping occurs, graduated braking may be overridden. If the consist 38 is moving when a fault requiring stopping occurs, thereby invoking a graduated braking, and if the consist 38 is then stopped by the operator before the graduated braking schedule is completed, graduated braking may be overridden.

In yet another example, if the powered unit 16 is being automatically controlled while pulling into a pullback route using, for example, automatic equipment identification (AEI) tag remote control techniques, graduated braking may be overridden. It may be necessary to override graduated braking because pullback tags are typically configured based on non-graduated levels of braking, so that the fixed distances associated with the AEI tags may not accommodate the longer stopping distances that may be needed with graduated braking. However, graduated braking may be used when shoving out of the pullback route where stopping distances may not be as critical. In another example, if the powered unit 16 is operating in a coast mode and reaches an overspeed condition while coasting, graduated braking may be overridden. In still yet another example, the graduated schedule may be selectively disabled.

In yet another example, if graduated braking is being applied to the powered unit 16 as a result of a fault, and an operator then commands the powered unit 16 to stop via the OCU 12, then the graduated braking schedule may be overridden and the independent and automatic brakes may be fully applied. In another aspect, if graduated braking is being applied to the powered unit 16, for example by applying a 3% increase in braking per second or other time period, if the powered unit 16 is sensed to still be increasing in speed, a more aggressive braking schedule may be applied, such as by increasing the level pf brake application in the graduated schedule to a 6% increase in braking per second.

Figure 2:
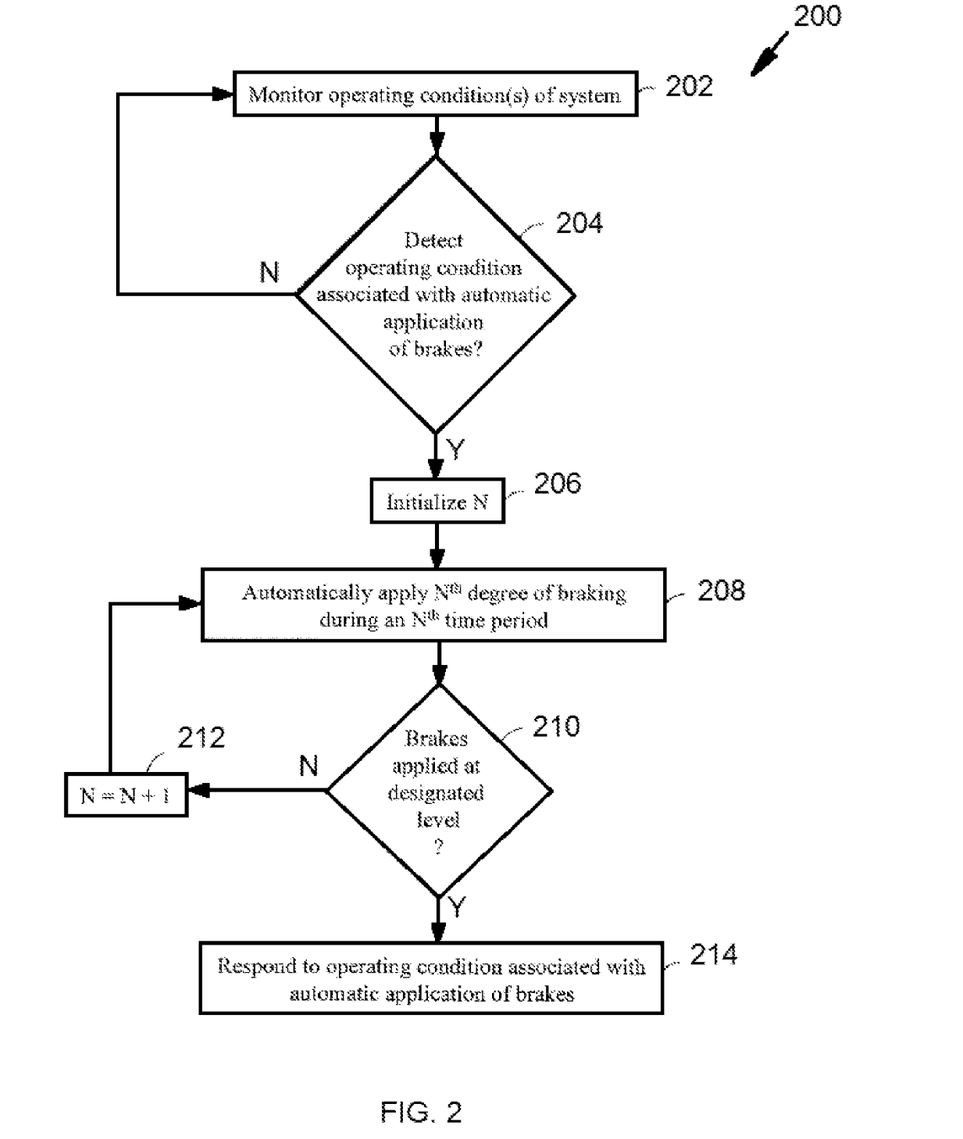
FIG. 2 illustrates a flowchart of one embodiment of a method for automatically applying brakes of a powered system, such as a vehicle consist or a powered unit.

FIG. 2 illustrates a flowchart of one embodiment of a method 200 for automatically applying brakes of a powered system, such as a vehicle consist or a powered unit. The method 200 may be used in conjunction with one or more embodiments of the control system 10 (shown in FIG. 1), the powered unit 16 (shown in FIG. 1), and/or the consist 38 (shown in FIG. 1).

At 202, operating conditions of a powered system, such as the powered unit 16 and/or the consist 38, are monitored. For example, operating conditions of the powered unit 16 and/or consist 38 may be monitored by the sensors 36 (shown in FIG. 1). The operating conditions may include speed, acceleration or deceleration, power output, temperature (e.g., engine temperature), mechanical conditions (e.g., vibrations), and the like.

At 204, a determination is made as to whether one or more of the operational conditions being monitored indicate a condition that is associated with automatic application of the brakes of the powered system. For example, a determination is made as to whether operational conditions indicative of a fault are detected. The fault may be detected when one or more of the operational conditions exceeds a designated threshold, falls below a designated threshold, enters or exits a range of values, and the like. For example, abnormally fast or slow acceleration or deceleration may indicate a fault with the engine and/or a motor of the powered unit 16. Abnormally large vibrations may indicate physical damage to a wheel or other component of the powered unit 16 and/or consist 38. Relatively large temperatures of the engine or motors may indicate a fault. Other operational conditions also may indicate potential faults.

As described above, some faults may be associated with automatic applications of brakes of the powered system. For example, faults representative of potential damage to one or more tractive components (e.g., engines, motors, wheels, and the like) of the powered system may trigger the automatic application of the brakes so that the powered system can stop moving to avoid further damage and/or risk to the safety of onboard passengers or cargo.

If an operating condition that is associated with automatic application of brakes is detected, the operating condition may indicate that the powered system needs to stop so that the cause of the fault associated with the operating condition can be identified and/or repaired before the powered system can continue to move. As a result, flow of the method 200 proceeds to 206. Alternatively, if the operating conditions do not indicate such a fault, then the powered system may continue to travel and flow of the method 200 may return to 202. For example, the method 200 may continue monitoring operational conditions of the powered system.

At 206, when the operating condition associated with automatic brake application is detected, a graduated braking schedule may be used to gradually apply the brakes, as described above. In one embodiment, the graduated braking schedule may begin by initializing a braking parameter (e.g., "N") that represents different brake levels and/or time periods of the braking schedule, as described above. The braking schedule may be initialized by setting the value of the braking parameter to a designated value representative of the first brake level that is applied in response to detection of the fault (e.g. from 204).

In one embodiment, the first brake level (and the value of the braking parameter) is based on a type or category of the fault that is detected. For example, one category or type of faults may include those operating conditions that indicate a fault in one or more tractive components of the powered system, in the control system 10 (e.g., in the VCU 14 or OCU 12 shown in FIG. 1), or in another component involved in controlling or causing movement of the powered system. Another type or category of faults may include those operating conditions that indicate a fault outside of the tractive components and control system of the powered system, such as a fault in one or more adhesion control systems, location systems (e.g., GPS), or other systems. The initialized value of the braking parameter can be based on the type or category of fault by assigning a larger value to the parameter for more severe faults or for those faults that present a more imminent threat to the safety of passengers and/or cargo than other faults.

At 208, a degree of braking associated with the value of the braking parameter is applied during a time period associated with the value of the braking parameter. With respect to the example braking schedule shown above in Table 1, a braking parameter having a value of 1 may cause the brake level of 3% to be applied during the first time period. If the braking parameter has a greater value (such as by having a greater initial value due to the type or category of fault), then a larger brake level may be applied. For example, with respect to Table 1, if the braking parameter has a value of 10, then a brake level of 30% may be initially applied. Alternatively, the braking parameter may have another initial value such that another brake level is initially applied.

At 210, a determination is made as to whether the brakes have been applied at a designated level or greater. For example, if the designated level is 100%, then a determination may be made as to whether the brakes have been fully applied. Alternatively, the designated level may be a lesser application of the brakes. If the brakes have not yet been applied to the designated level, then the application of brakes may need to be increased during a subsequent time period, as described above. As a result, flow of the method 200 may proceed to 212. On the other hand, if the brakes have been applied at the designated level, then the application or the brakes may no longer need to be increased. As a result, flow of the method 200 may proceed to 214.

At 212, the value of the braking parameter is increased. For example, the braking parameter (N) may be incrementally increased by a value of 1. Alternatively, another value may be used to increase the value of the braking parameter. Flow of the method 200 may proceed from 212 to 208, where the $N^{th}$ degree or level of braking is applied. The degree or level of braking that is applied can increase based on the increased value of the braking parameter. For example, if the previously applied braking level was 3% (e.g., with a braking parameter value of 1 in the example of Table 1 above), then the braking level that is next applied is 6%. The method 200 may continue in a loop-wise manner between 208, 210, and 212 to gradually increase the brake application level or grade, as described above.

In one embodiment, the degree of braking that is applied may be based on a deceleration force that is selected so that the consist is slowed in a manner that is effective to limit a peak deceleration rate experienced by the consist sufficient for reducing unintended movement of at least one of one or more riders or cargo onboard the consist. During braking or slowing of a moving vehicle, the deceleration forces experienced by cargo or riders of the vehicle may suddenly increase to a peak or upper value before decreasing when the braking of the vehicle is applied suddenly. In one embodiment, the incremental increases in the level or degree in which the brakes are applied can be established so that the peak deceleration that is experienced by the riders or cargo is decreased relative to braking the vehicle according to another, different braking schedule, such as a schedule that include larger increases in braking level, shorter time periods over which the different increases in braking level are applied, and the like.

One or more of the degrees of braking or the increases in the degrees of braking may be controlled so that the deceleration force experienced by riders and/or cargo is no more than a selected (e.g., designated) deceleration force. For example, a deceleration force may be designated as being a limit that can be safely experienced by riders and/or cargo in order to avoid the riders being thrown to the floor and/or cargo toppling over and being damaged. The degrees of braking and/or the increases in the degrees of braking can be limited or controlled in the braking schedule so that the deceleration forces that are actually experienced by the riders and/or cargo do not exceed the designated deceleration force.

In another embodiment, after one or more initial degrees or increases in degrees of braking are applied using the method 200 (e.g., the first few or a designated number of increases in the degree of braking), one or more additional degrees of braking or increases in the degrees of braking may be applied that differ from the first or initial degrees or increases in degrees of braking. The initial degrees of braking may be designated degrees (e.g., fixed or predetermined amounts) while the additional degrees may vary and/or be controlled in order to limit additional deceleration forces experienced by riders and/or cargo. Alternatively, the additional degrees of braking may be based on a percentage of a fully applied braking force.

In another embodiment, the value of the braking parameter may be increased at 212 by an amount that is based on the type or category of fault that is detected at 204. For example, with faults that are more severe or present a more imminent threat to safety to passengers or damage to cargo, the braking parameter may be increased by more than one so that the next brake level or degree that is applied is a larger increase. With respect to the schedule shown in Table 1, instead of increasing the braking level by 3%, the braking parameter may be increased by more than 1 so that the braking level is increased by 6%, 9%, or another amount.

At 214, the operating condition that is associated with or gave rise to identification of the automatic application of the brakes is responded to. For example, an operating condition associated with a fault with the tractive components of the powered system may be responded to by examining and/or repairing the tractive components. Once the fault has been responded to (e.g., repaired or otherwise corrected), the powered system may continue to travel along a route.

In another embodiment, a method (e.g., for automatically controlling braking of a powered system or consist) includes automatically applying a first degree of braking to a consist during a first time period when a powered unit of the consist is being locally or remotely controlled via an onboard control system in an absence of control inputs from an onboard operator. The first degree of braking is based on a first deceleration force selected so that the consist is slowed in a manner effective to limit a peak deceleration rate experienced by the consist sufficient for reducing unintended movement of at least one of one or more riders or cargo onboard the consist. The method also includes automatically applying a second degree of braking to the consist during a second time period following the first time period.

In another aspect, the second degree of braking is controlled based on a second selected deceleration force.

In another aspect, the first and second degrees of braking are further controlled based on percentage of a fully applied braking force.

In another aspect, additional degrees of braking other than the first degree of braking and the second degree of braking are provided. The additional degrees of braking are controlled based on at least one of additional deceleration forces or on a percentage of fully applied braking force.

In another aspect, the second degree of braking, or at least one of the additional degrees of braking, comprises a fully applied braking force.

In another aspect, the first and second degrees of braking differ from each other.

In another aspect, the second degree of braking is a first increase in braking force over the first degree of braking. The method further includes automatically applying a third degree of braking in the consist during a third time period following the second time period. The third degree of braking is a second increase in the braking force over the second degree of braking force that differs from the first increase in the braking force.

In another embodiment, another method (e.g., for automatically controlling application of a brake in a consist) is provided. The method includes automatically applying a first degree of braking to a consist during a first time period when a powered unit of the consist is being controlled via an onboard control system in an absence of control inputs from an onboard operator and automatically applying a second degree of braking to the consist during a second time period following the first time period. The first degree of braking is based on a first deceleration force selected so that the consist is slowed in a manner effective to limit a peak deceleration rate experienced by the consist such that unintended movement of cargo on board the consist is reduced.

In another aspect, the second degree of braking is controlled based on a second selected deceleration force.

In another aspect, the first and second degrees of braking are further controlled based on percentage of a fully applied braking force.

In another aspect, additional degrees of braking other than the first degree of braking and the second degree of braking are provided. The additional degrees of braking are controlled based on at least one of additional deceleration forces or on a percentage of fully applied braking force.

In another aspect, the second degree of braking, or at least one of the additional degrees of braking, comprises a fully applied braking force.

In another aspect, the first and second degrees of braking differ from each other.

In another aspect, the second degree of braking is a first increase in braking force over the first degree of braking. The method can also include automatically applying a third degree of braking in the consist during a third time period following the second time period. The third degree of braking is a second increase in the braking force over the second degree of braking force that differs from the first increase in the braking force.

In another embodiment, a control system includes a processor and a memory. The processor is configured to be disposed onboard a powered unit of a consist and to control braking efforts provided by a brake of the consist. The memory is configured to be communicatively coupled with the processor and includes a braking schedule that designates plural degrees of braking. The processor also is configured to automatically direct the brake of the consist to apply a first degree of braking of the plural degrees of braking in the memory during a first time period when the powered unit is being controlled by the processor in an absence of control inputs from an onboard operator. The first degree of braking is based on a first deceleration force selected so that the consist is slowed in a manner effective to limit a peak deceleration rate experienced by the consist sufficient for reducing unintended movement of at least one of one or more riders or cargo onboard the consist. The processor also is configured to automatically direct the brake of the consist to apply a second degree of braking to the consist during a second time period following the first time period.

In another aspect, the processor is configured to control or vary the second degree of braking based on a second selected deceleration force.

In another aspect, the processor is configured to control or vary the first and second degrees of braking based on percentage of a fully applied braking force.

In another aspect, the braking schedule of the memory includes additional degrees of braking other than the first degree of braking and the second degree of braking. The processor can be configured to control or vary the additional degrees of braking based on at least one of additional deceleration forces or on a percentage of fully applied braking force.

In another aspect, the second degree of braking, or at least one of the additional degrees of braking, comprises a fully applied braking force.

In another aspect, the first and second degrees of braking differ from each other.

In another aspect, the second degree of braking is a first increase in braking force over the first degree of braking. The processor can be configured to automatically apply a third degree of braking in the consist during a third time period following the second time period. The third degree of braking is a second increase in the braking force over the second degree of braking force that differs from the first increase in the braking force.

In another aspect, the processor is configured to be controlled remotely by an operator control unit disposed off board of the consist.

Based on the foregoing specification, the inventive subject matter may be implemented using computer programming or engineering techniques including computer software, firmware, hardware or any combination or subset thereof, wherein at least one technical effect is to perform automatic vehicle braking in response to a sensed fault condition. Any such resulting program, having computer-readable code, may be embodied or provided within one or more computer-readable media, thereby making a computer program product (for example, an article of manufacture, according to at least one embodiment of the inventive subject matter. The computer readable media may be, for instance, a fixed (hard) drive, diskette, optical disk, magnetic tape, semiconductor memory such as read-only memory (ROM), and the like, or any transmitting/receiving medium such as the Internet or other communication network or link. The article of manufacture containing the computer code may be made and/or used by executing the code directly from one medium, by copying the code from one medium to another medium, or by transmitting the code over a network.

A person of ordinary skill in the art of computer science will easily be able to combine the software created as described with appropriate general purpose or special purpose computer hardware, such as a microprocessor, to create a computer system or computer sub-system embodying the method of the inventive subject matter. An apparatus for making, using, or selling the inventive subject matter may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody one or more aspects of the inventive subject matter.

While various embodiments of the presently described inventive subject matter have been shown and described herein, the embodiments are provided by way of example only. Numerous variations, changes, and substitutions may be made without departing from the scope of the inventive subject matter provided herein. Accordingly, it is intended that one or more embodiments of the inventive subject matter be limited only by the spirit and scope of the appended claims.

What is claimed is:

1. A method comprising:
   automatically applying a first degree of braking to a consist during a first time period when a powered unit of the consist is being locally or remotely controlled via an onboard control system in an absence of control inputs from an onboard operator, the first degree of braking based on a first deceleration force selected so that the consist is slowed in a manner effective to limit a peak deceleration rate experienced by the consist sufficient for reducing unintended movement of at least one of one or more riders or cargo onboard the consist; and
   automatically applying a second degree of braking to the consist during a second time period following the first time period.

2. The method of claim 1, wherein the second degree of braking is controlled based on a second selected deceleration force.

3. The method of claim 1, wherein the first and second degrees of braking are further controlled based on percentage of a fully applied braking force.

4. The method of claim 1, further comprising additional degrees of braking other than the first degree of braking and the second degree of braking, wherein the additional degrees of braking are controlled based on at least one of additional deceleration forces or on a percentage of fully applied braking force.

5. The method of claim 4, wherein the second degree of braking, or at least one of the additional degrees of braking, comprises a fully applied braking force.

6. The method of claim 1, wherein the first and second degrees of braking differ from each other.

7. The method of claim 1, wherein the second degree of braking is a first increase in braking force over the first degree of braking, and further comprising automatically applying a third degree of braking in the consist during a third time period following the second time period, wherein the third degree of braking is a second increase in the braking force over the second degree of braking force that differs from the first increase in the braking force.

8. A method comprising:
   automatically applying a first degree of braking to a consist during a first time period when a powered unit of the consist is being controlled via an onboard control system in an absence of control inputs from an onboard operator; and
   automatically applying a second degree of braking to the consist during a second time period following the first time period;
   wherein the first degree of braking is based on a first deceleration force selected so that the consist is slowed in a manner effective to limit a peak deceleration rate experienced by the consist, whereby unintended movement of cargo on board the consist is reduced.

9. The method of claim 8, wherein the second degree of braking is controlled based on a second selected deceleration force.

10. The method of claim 8, wherein the first and second degrees of braking are further controlled based on percentage of a fully applied braking force.

11. The method of claim 8, further comprising additional degrees of braking other than the first degree of braking and the second degree of braking, wherein the additional degrees of braking are controlled based on at least one of additional deceleration forces or on a percentage of fully applied braking force.

12. The method of claim 11, wherein the second degree of braking, or at least one of the additional degrees of braking, comprises a fully applied braking force.

13. The method of claim 8, wherein the first and second degrees of braking differ from each other.

14. The method of claim 8, wherein the second degree of braking is a first increase in braking force over the first degree of braking, and further comprising automatically applying a third degree of braking in the consist during a third time period following the second time period, wherein the third degree of braking is a second increase in the braking force over the second degree of braking force that differs from the first increase in the braking force.

15. A control system comprising:
   a processor configured to be disposed onboard a powered unit of a consist, the processor also configured to control braking efforts provided by a brake of the consist; and
   a memory configured to be communicatively coupled with the processor, the memory including a braking schedule that designates plural degrees of braking,
   wherein the processor also is configured to:
      automatically direct the brake of the consist to apply a first degree of braking of the plural degrees of braking in the memory during a first time period when the powered unit is being controlled by the processor in an absence of control inputs from an onboard operator, the first degree of braking based on a first deceleration force selected so that the consist is slowed in a manner effective to limit a peak deceleration rate experienced by the consist sufficient for reducing unintended movement of at least one of one or more riders or cargo onboard the consist; and
      automatically direct the brake of the consist to apply a second degree of braking to the consist during a second time period following the first time period.

16. The system of claim 15, wherein the processor is configured to control or vary the second degree of braking based on a second selected deceleration force.

17. The system of claim 15, wherein the processor is configured to control or vary the first and second degrees of braking based on percentage of a fully applied braking force.

18. The system of claim 15, wherein the braking schedule of the memory includes additional degrees of braking other than the first degree of braking and the second degree of braking, and wherein the processor is configured to control or vary the additional degrees of braking based on at least one of additional deceleration forces or on a percentage of fully applied braking force.

19. The system of claim 18, wherein the second degree of braking, or at least one of the additional degrees of braking, comprises a fully applied braking force.

20. The system of claim 15, wherein the first and second degrees of braking differ from each other.

21. The system of claim 15, wherein the second degree of braking is a first increase in braking force over the first degree of braking, and wherein the processor is configured to automatically applying a third degree of braking in the consist during a third time period following the second time period, the third degree of braking being a second increase in the braking force over the second degree of braking force that differs from the first increase in the braking force.

22. The system of claim 15, wherein the processor is configured to be controlled remotely by an operator control unit disposed off board of the consist.

* * * * *